Patented Feb. 1, 1949

2,460,567

UNITED STATES PATENT OFFICE 2,460,567

AROMATIC MERCAPTO-ALIPHATIC ETHERS AS MODIFIERS FOR BUTADIENE EMULSION POLYMERIZATION

George L. Browning, Jr., Cleveland, Ohio, assignor to The B. F. Goodrich Company, New York, N. Y., a corporation of New York No Drawing. Application October 4, 1944, Serial No. 557,222

8 Claims. (Cl. 260—86.5)

This invention relates to the modification of the polymerization of butadiene-1,3 hydrocarbons to form synthetic rubber products closely resembling natural crude rubber in plasticity and processability, and particularly to the polymerization of butadiene-1,3 hydrocarbons in aqueous emulsion in the presence of a new and improved class of polymerization modifiers.

The polymerization in aqueous emulsion of butadiene-1,3 hydrocarbons, either alone or in admixture with one another or with other organic compounds copolymerizable therewith, to form products more or less resembling natural rubber is well known. It has been commonly observed, however, that such products often resemble vulcanized natural rubber rather than unvulcanized natural rubber in plasticity and processability unless the polymerization is effected in the presence of small amounts of certain organic compounds called "modifiers" or "regulators" of butadiene-1,3 polymerization.

Organic compounds which are known to be effective as modifiers for the polymerization of butadiene-1,3 hydrocarbons and which are ordinarily used for this purpose include aliphatic mercaptans containing from about 8 to 18 carbon atoms such as n-octyl mercaptan, lauryl mercaptan and the like. However, the synthetic rubbers prepared using such modifiers have not been entirely suitable, particularly for use in the manufacture of tires, because of the fact that they, although somewhat plastic, are still difficult to mill, particularly at high temperatures, and because of the additional fact that when vulcanized their hysteresis and resistance to flex-cracking are considerably inferior to that of natural rubber.

It has now been discovered that aromatic mercapto-aliphatic ethers of the type wherein an ether linkage is attached on the one hand to a carbon atom occurring in an aliphatic structure comprising a mercapto group, and on the other hand to a nuclear carbon atom of an aromatic group, are far superior to the simple aliphatic mercaptans as modifiers for the polymerization of butadiene-1,3 hydrocarbons since their use results in the formation of synthetic rubbers which possess improved milling properties, and which when vulcanized possess a much lower hysteresis and a much higher resistance to flex-cracking. In addition, such mercapto-ethers function exceedingly well as polymerization modifiers in lowering the viscosity and increasing the solubility in organic solvents of polymers prepared in their presence, and many of them also function as polymerization accelerators thereby enabling the polymerization to be effected more rapidly than is ordinarily possible when using other modifiers. Moreover it has been found, by intrinsic viscosity determinations, that the plastic soluble butadiene-1,3 polymers prepared in the presence of such substances possess a higher average molecular weight than polymers prepared in the presence of known modifying agents, and hence they constitute a novel class of synthetic rubbers.

Any mercapto ether of the type wherein an ether linkage (which may be either an oxygen ether linkage or a thioether linkage) is attached on the one hand to a carbon atom occurring in an aliphatic radical comprising a mercapto group, and on the other hand to a nuclear carbon atom of an aromatic group, may be employed as the polymerization modifier in this invention. Such compounds, in general, may be represented by the formula: Ar—(X—A)$_n$—SH, wherein Ar is an aromatic radical having its connecting valence on a nuclear carbon atom, such as the various aryl and substituted aryl groups; each X is an ether-forming element occuring in group 6 and in one of the short periods of the periodic table, that is, oxygen or sulfur; each A is a divalent aliphatic radical such as the various alkylene and substituted alkylene groups and $n$ is an integer.

Such mercapto ethers are new chemical compounds, useful for a variety of purposes, as is more fully disclosed in my copending application Serial No. 557,221 filed concurrently herewith on October 4, 1944 and now abandoned.

The method of preparing these novel mercapto-ethers may be varied considerably depending on the particular compound but in general they are most conveniently obtained from the corresponding halo-ethers, many of which are known compounds, by replacing the halogen atom of the halo-ether with a mercapto group. Such a replacement may be accomplished quite readily by treating the halo-ether in alkaline solution, such as in a solution of sodium ethoxide or in a solution of alcoholic potassium hydroxide, with excess hydrogen sulfide at a temperature of about 50 to 200° C.

Typical examples of specific mercapto-ethers of the type described, which may be employed as modifiers in this invention, and their method of preparation are set forth in the following Examples 1 to 16.

EXAMPLE 1

*Beta-phenoxyethyl mercaptan*

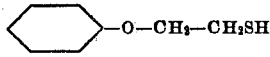

A solution of sodium ethoxide prepared by adding 8.5 g. (0.37 gram-atom) of metallic sodium to 300 ml. of absolute ethanol, is saturated with hydrogen sulfide by passing the latter into the solution for about 4 hrs. To this solution there is then slowly added with stirring 70.4 g. (0.35 mole) of beta-phenoxyethyl bromide (prepared by the reaction of phenol with ethylene dibromide in the manner described in Organic Synthesis, 2nd ed., 1941, collective vol. I, p. 435) dissolved in 100 ml. of ethanol. The reaction mixture is heated on a steam bath with continued stirring for three or four hours during which time hydrogen sulfide is passed into the mixture. It is then poured into water; the water-insoluble material salted out, extracted with ether and dried over sodium sulfate in the usual manner. Fractional distillation of the water-insoluble material remaining on removal of the ether yields 24.9 g. (65% yield) of the desired beta-phenoxyethyl mercaptan B. P. 112° C./7.5 mm. Analysis of the mercaptan to determine its mercapto-sulfur content reveals the following:

% S as SH

| Calculated | Found | Purity |
|---|---|---|
| 20.75 | 18.65 | Per cent 90 |

EXAMPLE 2

*Beta-phenoxy-beta'-mercapto-diethyl ether*

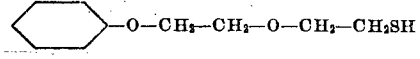

Beta-phenoxy-beta'-chloro-diethyl ether (B. P. 107–108 10.5 mm.; $n_D^{20}$ 1.5200) is prepared by dissolving 94 g. (1.0 mole) of phenol in a sodium ethoxide solution prepared from 23 g. (1.0 gram-atom) of sodium and 500 ml. of absolute ethanol, adding this solution slowly to 143 g. (1.0 mole) of beta-beta'-dichlorodiethyl ether, refluxing the reaction mixture on a steam bath for about 8 hours, filtering the reaction product to remove the salt formed by the reaction, and fractionally distilling the filtrate. The yield of beta-phenoxy-beta'-chlorodiethyl ether thereby obtained is 90.0 g. or 45%.

The 90.0 g. (0.45 mole) of the chloro-ether obtained above is placed in a stainless steel autoclave with 45 g. (0.67 mole) of potassium hydroxide and 400 ml. of methanol. The contents of the autoclave are then saturated with hydrogen sulfide until a pressure of 55 lbs. is achieved, and heated at a temperature of 127–147° C. for about 2 hours. After cooling, the excess hydrogen sulfide is vented; the contents of the autoclave are transferred to a brine solution; the water-insoluble product of the reaction is extracted with ether; and the ether extracts dried. Distillation of the product yields 42.6 grams (48%) of beta-phenoxy-beta'-mercapto-diethyl ether, B. P. 125–127° C./3 mm.; $n_D^{20}$ 1.5369; purity 91.2%.

EXAMPLE 3

*Beta-2-naphthoxy-beta'-mercapto-diethyl ether*

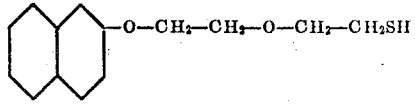

Beta-2-naphthoxy-beta'-chloro-diethyl ether B. P. 173° C./0.5 mm.) is prepared in the manner described for the phenoxy derivative in Example 2 using an equivalent amount of beta-naphthol instead of phenol. This chloro compound is then reacted with hydrogen sulfide in alcoholic KOH solution in an autoclave in the manner described in Example 2. The product is beta-2-naphthoxy-beta'-mercapto-diethyl ether, B. P. 188–190° C./0.3 mm.; purity 90.3%.

EXAMPLE 4

*Beta-thiophenoxy-beta'-mercapto-diethyl ether*

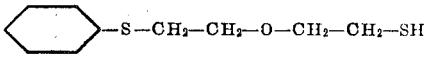

The reaction of 64.9 g. (0.3 mole) of beta-thiophenoxy-beta'-chloro-diethyl ether (prepared by the reaction of thiophenol with beta-beta'-dichloro-diethyl ether in the manner described in Example 2 for the preparation of the analogous phenoxy compound) with excess hydrogen sulfide in alcoholic KOH solution in an autoclave is effected in the manner described in Example 2. A 67% yield of beta-thiophenoxy-beta'-mercapto-diethyl ether (B. P. 126–130° C./2 mm.; $n_D^{20}$ 1.5808; purity 95.6%) is thereby obtained.

EXAMPLE 5

*Beta (p-tertiaryoctylphenoxy)-beta'-mercapto-diethyl ether*

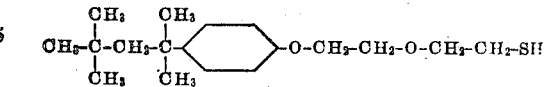

Diisobutylene (1 mole) and phenol (1 mole) are stirred together at 25° C. while 18 g. (0.175 mole) of 95.5% sulfuric acid is slowly added, and the reaction mixture is then allowed to stand overnight. A solution of sodium hydroxide (16 g.) in 1½ liters of water is then added and the mixture heated for about an hour at 90° C. After cooling, the reaction mixture is extracted with benzene, the extracts dried, the benzene removed, and the residue fractionally distilled. The fraction boiling from 140 to 142° C. at 2 mm. is collected as p-tertiaryoctylphenol, which solidifies as white needles having a melting point of 83.0–84.2° C. (the radical,

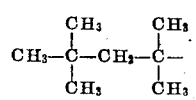

believed to be present in the octyl phenol derived from diisobutylene being designated herein as the tertiaryoctyl radical).

80 grams (0.38 mole) of the p-tertiaryoctyl phenol thus obtained is dissolved in a sodium ethoxide solution prepared from 8.8 grams (0.38 gram atoms) of sodium and 250 ml. of absolute ethanol. This solution is then added over a period of 45 minutes to 110 grams (0.75 mole) of beta-beta'-dichloro-ethyl ether, and the resulting mixture is heated on a steam bath with stirring for about 8 hours. The reaction mixture is then filtered to remove the salt formed by the reaction, and the filtrate distilled. A 55% yield of the desired chloride, beta (p-tertiaryoctylphenoxy)-beta'-chloro-diethyl ether (B. P. 193–198° C. at 4.5 mm., $n_D^{20}$ 1.5080) is obtained.

78.5 grams (0.25 mole) of the chloride are placed in a stainless steel autoclave with 25 grams (0.375 mole) of potassium hydroxide and 300 ml. of methanol; the autoclave contents are saturated with hydrogen sulfide to a pressure of 50 lbs.; and the contents are allowed to react at 150–160° C. for 3–4 hours. After cooling the autoclave and removing unreacted hydrogen sulfide, the reaction product is mixed with a brine solution and extracted with ether. From the ether extract there is obtained in good yield the desired beta (p-tertiaryoctylphenoxy)-beta'-mercapto-diethyl ether (B. P. 172–175° C./8 mm.; $n_D^{20}$ 1.5204; purity 97.5%).

This same mercapto ether may also be prepared, although not in quite so pure a form, in the same manner as above using beta (p-tertiaryoctylphenoxy)-beta'-chloro-diethyl ether which is presently commercially available instead of the material synthesized in the manner indicated above.

EXAMPLES 6 TO 11

In these examples other mercapto ethers of the formula

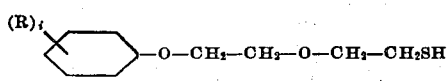

wherein R is a hydrocarbon radical and $i$ is a numeral less than five, analogous to the p-tertiaryoctyl compound described in Example 5, are prepared in a manner similar to the synthesis described in Example 5. In each case a phenol of the

type is reacted with beta-beta'-dichloro-diethyl ether to form an aromatic aliphatic ether chloride which is then treated with hydrogen sulfide to replace the chlorine atom with the mercapto group. The following table shows the phenol employed to react with dichloroethyl ether, the mercapto-ether finally obtained and its boiling point and purity:

| Example | Phenol Used as Reactant | Mercapto-Ether Obtained as Product |
| --- | --- | --- |
| 6 | p-cresol | beta(p-methylphenoxy)-beta'-mercaptodiethyl ether (B. P. 145–146° C./2 mm.; 96% purity). |
| 7 | p-isopropylphenol | beta(p-isopropylphenoxy)-beta'-mercaptodiethyl ether (B. P. 156.5–157° C./3 mm.; 95.5% purity). |
| 8 | p-tertiaryamyl-phenol | beta(p-tert.-amylphenoxy)-beta'-mercaptodiethyl ether (B. P. 171–172° C./2.5 mm.; 90% purity). |
| 9 | p-isoheptyl phenol | beta(p-isoheptylphenoxy)-beta'-mercaptodiethyl ether (B. P. 175–182° C./2 mm.; 91.6% purity). |
| 10 | p-cyclohexyl phenol | beta(p-cyclohexylphenoxy)-beta'-mercaptodiethyl ether (B. P. 186–187° C./2 mm.; 91% purity). |
| 11 | 2,4-ditertiaryamyl phenol | beta(2,4-ditertiaryamylphenoxy)-beta'-mercapto-diethyl ether (B. P. 178°/0.8 mm.; 90.2% purity). |

EXAMPLE 12

*Alpha-alpha'-dimethyl-beta(p-tertiaryoctylphenoxy)-beta'-mercapto-diethyl ether*

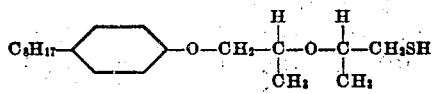

The compound indicated above is prepared from the corresponding chloride (alpha-alpha'-dimethyl-beta(p-tertiaryoctylphenoxy)-beta'-chloro-diethyl ether which is available commercially and which may be prepared by the reaction of p-tertiaryoctyl phenol with beta-beta'-dichloroisopropyl ether) by reaction in an autoclave with hydrogen sulfide in the manner of the preceding examples. Its boiling point is 173–178° C./2 mm. and it is obtained in 90.3% purity.

EXAMPLE 13

*Alpha-alpha'-dimethyl-beta-thiophenoxy-beta'-mercapto-diethyl ether*

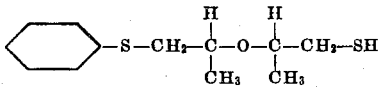

Thiophenol is reacted with beta-beta'-dichlorodiisopropyl ether in the manner in which phenol is reacted with dichlorodiethyl ether as described in Example 2. A 44% yield of alpha-alpha'-dimethyl - beta - thiophenoxy - beta' - chlorodiethyl ether is obtained. This compound is then reacted with hydrogen sulfide in the manner of the preceding examples to give in good yield alpha - alpha' - dimethyl - beta - thiophenoxy-beta'-mercapto-diethyl ether (B. P. 142° C./ 1 mm.; 96% purity).

EXAMPLE 14

*Beta(2-phenoxyethoxy)-beta'-mercapto-diethyl ether*

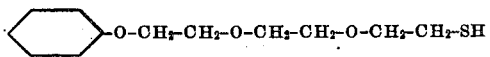

The above compound is prepared by placing 68 g. (0.277 mole) of beta (2-phenoxyethoxy)-beta'-mercapto-diethyl ether (prepared by the reaction of phenol and diethylene glycol dichloride) in an autoclave with 27.8 g. of potassium hydroxide, 280 ml. of methanol and sufficient hydrogen sulfide to produce a pressure of 53 lbs. and heating the autoclave contents for 3 hours to a temperature of 120–150° C. Its boiling point is 150–158° C./4 mm. and its purity is 93.3%.

EXAMPLE 15

*Beta(2-p-octylphenoxy-ethoxy)-beta'-mercapto-diethyl ether*

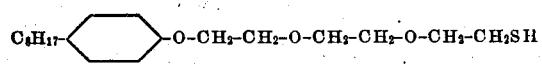

Example 14 is repeated except that beta(2-p-octylphenoxy-ethoxy)-beta'-chloro-diethyl ether (a commercially available chloride) is employed in place of the chloro-compound there described. The product is the compound indicated above whose characteristics are: B. P. 222–223° C./2.5 mm.; purity 92.8%.

Example 16

*Beta-(2-p-dipentenylphenoxy-ethoxy)-beta'-mercapto-diethyl ether*

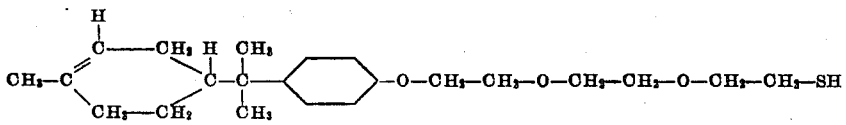

Example 14 is again repeated except that beta-(2 - p - dipentenylphenoxy - ethoxy) - beta'-chloro-diethyl ether (a commercially available chloride) is employed in place of the chloro-compound there described. The product boiling at 212–222° C. at 2 mm. is a mercapto-ether believed to consist principally of the compound indicated above.

The compounds set forth in the above examples are illustrative of the preferred mercapto-ethers to be employed as modifiers in this invention. Such preferred mercapto-ethers possess the general formula: Ar—(X—A)$_n$—SH set forth hereinabove, wherein Ar is restricted to an aryl hydrocarbon radical (that is, a radical composed entirely of carbon and hydrogen, which contains an aromatic ring structure and which has its connecting valence on a carbon atom occurring in the aromatic ring), and A is restricted to an alkylene radical (that is, a bivalent aliphatic hydrocarbon radical having its two valences attached to different carbon atoms).

As is apparent from the disclosure of these examples, the scope of the aryl hydrocarbon radical (Ar in the general formula) includes not only radicals in which all carbon atoms are aromatic ring carbon atoms, such as phenyl, naphthyl, anthracyl, phenanthryl and biphenyl radicals (illustrated by Examples 1 to 4, 13 and 14), but also radicals of this type in which one or more of the hydrogen atoms are substituted by hydrocarbon radicals of any type such as straight-chain or branched-chain, saturated or unsaturated, aliphatic hydrocarbon radicals (illustrated by Examples 5 to 8, 10 to 12, and 15), cyclo-aliphatic radicals (illustrated by Example 7) and alicyclic hydrocarbon radicals (illustrated by Example 16). As is also apparent from these examples, the scope of the alkylene radical (A in the general formula) includes not only alkylene radicals consisting of a straight chain of methylene groups such as the ethylene radical and its homologs (illustrated by Examples 1 to 11 and 14 to 16) but also alkylene radicals having one or both of their connecting valences attached to a non-terminal carbon atom so as to give branched-chain, secondary and tertiary alkylene radicals (illustrated by Examples 12 and 13). Moreover, these examples illustrate that the number of ether linkages present (or the value of $n$ in the (X—A)$_n$ structure in the general formula) may be varied ($n=1$ in Example 1; $n=2$ in Examples 2 to 13; and $n=3$ in Examples 14 to 16); and that the nature of both the ether-forming element and the alkylene group (X and A respectively in the general formula) may remain constant (as in Examples 2, 3, 5 to 11 and 14 to 16) or may be varied (as in Examples 4, 12 and 13) in compounds which contain a plurality of such structures (that is, in compounds in which the value of $n$ in the (X—A)$_n$ structure in the general formula is greater than 1).

Numerous other compounds in addition to those specifically set forth in Examples 1 to 16 are also included as preferred aromatic mercapto-aliphatic ethers to be used in this invention, as set forth above. Such other compounds may be prepared in a manner analogous to the preparations described in Examples 1 to 16 by reacting the aromatic halo-aliphatic ether corresponding to the desired mercapto-ether with hydrogen sulfide or an alkali sulfide or bisulfide. Many of the corresponding halo-ethers are described in U. S. Patents 2,176,834, 2,249,111 and 2,273,622 and may be prepared in the manner therein indicated. Moreover, the halo-ethers corresponding to the preferred mercapto-ethers may also be prepared by reacting the appropriate monohydric phenols or thiophenols with alkylene dihalides (which gives the halo-ethers corresponding to the preferred mercapto-ethers containing only a single ether linkage), with dichloroalkylethers or dichloroalkylthioethers (which gives the halo-ethers corresponding to the preferred mercapto-ethers containing two ether linkages) or with the dihalogen derivatives obtained by replacing the hydroxyl groups of polyalkylene glycols or their sulfur analogs with halogen atoms (which gives the halo-ethers corresponding to the preferred mercapto-ethers containing a plurality of ether linkages).

Specific examples of other compounds in addition to those described in Examples 1 to 16, coming within the preferred subclass, include the following:

Beta-2-naphthoxyethyl mercaptan
Beta-thiophenoxyethyl mercaptan
Beta(p-methylphenoxy)ethyl mercaptan
Beta(3-methyl-6-isopropyl-phenoxy)ethyl mercaptan
Beta(2,3,5-trimethylphenoxy)ethyl mercaptan
Beta(p-n-hexylphenoxy)ethyl mercaptan
Beta(o-phenyl-phenoxy)ethyl mercaptan
Beta(p-tert.-octyl-phenoxy)ethyl mercaptan
Beta(p-sec.-butyl-thiophenoxy)ethyl mercaptan
Beta(p-allyl-phenoxy)ethyl mercaptan
Beta(p-octadecyl-phenoxy)ethyl mercaptan
Beta(p-camphyl-phenoxy)ethyl mercaptan
Beta(p-benzylphenoxy)ethyl mercaptan
Beta-(1-phenanthroxy)ethyl mercaptan
Gamma-phenoxy-n-propyl mercaptan
1-mercapto-4-phenoxy-butane
1-mercapto-5-phenoxy-octane
1-phenoxy-10-mercapto-octadecane
1-(p-butyl-phenoxy)-2-mercapto propane
2-(p-octylphenoxy)-3-mercapto-butane
1-(p-octylphenoxy)-2-methyl - 2-mercapto-propane
1-mercapto-2(p-octylphenoxy)-propane
2-(p-octylphenoxy)-2,3-dimethyl - 2 - mercapto-butane
Beta(2-naphthoxy)-beta'-mercapto-diethyl ether
Beta-beta'-dimethyl-beta(p-octylphenoxy)beta'-mercapto-diethyl ether
Beta-(p-methyl-phenoxy)-beta'-mercapto-diethyl sulfide
Beta(p-isoundecyl-phenoxy)-beta'-mercapto-diethyl ether
Beta-phenoxy-beta'-mercapto - di - tetramethyl-ethyl-ether
Delta-phenoxy - delta - ethyl - delta'-mercapto-delta'-ethyl-dibutylether
Beta-phenoxy-beta'-mercapto-dioctylether
Beta(2,3,4,5 - tetramethylphenoxy) - beta'-mercapto-diethyl ether Gamma(p - camphyl - phenoxy) - gamma' - mercapto-dipropyl ether
Beta(2-methyl-4 - tertiarybutyl) phenoxy - beta'-mercapto-diethyl ether
Beta(2-p-cyclohexyl - phenoxy - ethoxy) - beta'-mercapto-diethyl ether
Beta(p-octylphenoxy-undeca-ethoxy) ethyl mercaptan

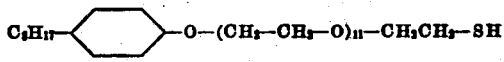

prepared from the corresponding alcohol, which is known commercially as "Triton N-100," by reaction of the alcohol with sulfuric acid to form the corresponding sulfate and then reaction of the sulfate with H₂S in alkaline solution to produce the mercaptan.

Of particular importance among the numerous compounds included as preferred aromatic mercapto-aliphatic ethers are those possessing the formula

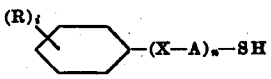

wherein R is a hydrocarbon radical, preferably containing no more than 18 carbon atoms, especially an aliphatic, cycloaliphatic or alicyclic hydrocarbon radical containing from 4 to 12 carbon atoms; *i* is a numeral less than 5; X is oxygen or sulfur; A is a lower alkylene radical such as those containing from 2 to 8 carbon atoms and *n* is a small integer say from 1 to 3. Such compounds are of outstanding value as modifiers for the polymerization of butadiene-1,3 since they not only enable improved polymers to be produced but they also are most effective in accelerating the rate of polymerization; compounds where R is a straight or branched chain alkyl group of 4 to 12 carbon atoms, *i* is one, and R is attached to the para position of the benzene ring being of especial utility for this purpose. Compounds of this type wherein *n* is 2 or 3 are often superior as modifiers to those in which *n* is only one; and compounds of this type wherein A is an alkylene radical of 2 to 8 carbon atoms having at least one of its two valences (especially the valence on the alkylene radical attached to the mercapto group) on a secondary or tertiary carbon atom, are often more effective modifiers than those in which A is an alkylene radical consisting of a plurality of methylene groups. Thus, for example, compounds containing any of the following structures wherein R is a non-aromatic hydrocarbon radical, preferably containing from 4 to 12 carbon atoms, and their sulfur analogs, are exceedingly valuable modifiers for use in this invention:

R—⟨benzene⟩—O—CH₂-CH₂-O—CH₂-CH₂—SH

R—⟨benzene⟩—O—CH₂-CH₂-O-CH₂-CH₂-O—CH₂-CH₂—SH

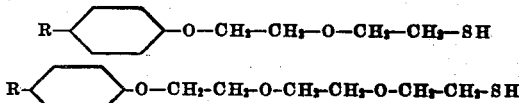

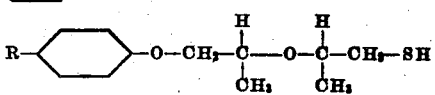

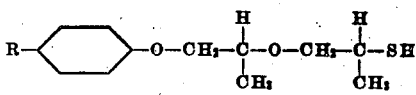

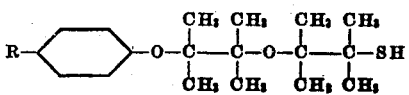

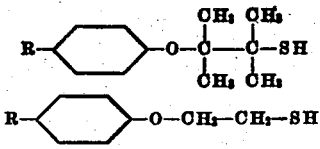

R—⟨benzene⟩—O—CH₂—CH₂—SH

Many specific examples of such compounds are described in Examples 5 to 10, and 12 to 16, while others are named hereinabove.

In addition to the preferred mercapto-ethers discussed above, many other compounds are also included in the broad class of aromatic mercapto-aliphatic ethers which may be employed in this invention. Thus, compounds of the general formula $$Ar—(X—A)_n—SH$$

wherein A is an alkylene radical and Ar is an aromatic radical other than an aryl hydrocarbon radical, that is, a radical containing an aromatic ring and comprising in addition to carbon and hydrogen, other non-metallic elements conventionally present in organic compounds such as oxygen, sulfur, nitrogen, chlorine and bromine; compounds of the general formula wherein Ar is an aryl hydrocarbon radical and A is a bivalent aliphatic radical other than an alkylene radical, such as methylene and other bivalent aliphatic radicals in which both valences are attached to the same carbon atom, or an unsaturated bivalent aliphatic hydrocarbon radical having its connecting valences attached to carbon atoms, or a bivalent aliphatic radical having its connecting valences attached to carbon and containing other elements in addition to carbon and hydrogen; and compounds wherein Ar is an aromatic radical other than an aryl hydrocarbon radical and A is a bivalent aliphatic radical other than alkylene, are all included as modifiers within the broad scope of this invention.

In modifiers of the broad class which contains only carbon, hydrogen, oxygen, and sulfur, it is preferred that all the oxygen and sulfur, except for the sulfur of the mercapto group, be present in ether linkages, since such compounds are more readily prepared and are generally more useful, but the presence of oxygen or sulfur in other groups such as hydroxyl, mercapto, carbonyl and thiono is also contemplated. Examples of compounds of this type in which the oxygen or sulfur is present in the preferred form, in addition to those already disclosed, include compounds containing alkoxy or thioalkoxy substituents present in the Ar or A portion of the molecule, such as beta(p-methoxy-phenoxy)-beta'-mercapto-diethyl ether (which may be prepared by first reacting para-methoxy phenol and diclorodiethyl ether to form beta (p-methoxy-phenoxy)-beta'-chloro-diethyl ether and then replacing the chlorine of this compound with the mercapto group in the usual manner), and alpha-alpha'-di-methoxy-beta-phenoxy beta' mercapto-diethyl ether (which may be prepared from phenol and alpha-alpha' - dimethoxy - beta - beta'-dichlorodiethyl ether).

In compounds of the broad class which may also contain nitrogen in addition to carbon, hydrogen and oxygen or sulfur, it is preferred that the nitrogen be present as nitro groups attached to an aromatic ring, but the presence of nitrogen in other groups such as amine, amide and azo groupings is also contemplated. An example of a compound within the broad class and containing nitrogen is beta (p-nitro-phenoxy) beta'-mercapto-diethyl ether which may be prepared from p-nitrophenol and dichlorodiethyl ether, Still other modifiers within the broad class include those which contain halogen atoms such as the halo-aromatic mercapto-aliphatic ethers. Compounds of this type beta(4-chlorophenoxy)-beta'-mercapto-diethyl ether and beta(5-chloro-2-xenoxy)-beta'-mercapto-diethyl ether, for example, may be prepared from the haloaryl-oxy-halo-dialkyl ethers described in U. S. Patent 2,205,392 to Coleman et al. by replacement of the halogen occurring in the aliphatic portion of the molecule with the mercapto group, in the usual manner.

It is to be noted that the broad class of aromatic mercapto-aliphatic ethers employed as modifiers in this invention is not limited to compounds containing any required number of carbon atoms. Compounds containing as few as 6 carbon atoms in the aromatic portion of the molecule and as few as 2 carbon atoms in the aliphatic portion of the molecule (in beta-phenoxy-ethyl mercaptan, for instance); compounds containing as many as 24 carbon atoms in the aromatic portion of the molecule (in beta-(p-octadecyl-phenoxy) ethyl mercaptan, for instance) and compounds containing as many as 24 carbon atoms in the aliphatic portion of the molecule (in beta(p-octyl-phenoxy-undecaethoxy)ethyl mercaptan, for instance) have all been specifically disclosed, and it is apparent that compounds containing an even higher number of carbon atoms may be employed. Accordingly, the number of carbon atoms present in Ar and in A and the numerical value of the integer $n$ in the general formula $$Ar—(X—A)_n—SH$$

is not critical. However, for practical purposes, Ar may be said to be an aromatic radical containing less than 50 carbon atoms, generally from 6 to 24 carbon atoms; and the number of carbon atoms in the aliphatic portion of the molecule, that is, the product of the number of carbon atoms in the bivalent aliphatic radical A times the value of the integer $n$ may also be said to be less than 50, generally from 2 to 24.

In the practice of the invention employing the mercapto-ether modifiers hereinabove described, monomeric butadiene-1,3 hydrocarbons either alone or in admixture with other copolymerizable monomers, preferably styrene or acrylonitrile, are polymerized in aqueous emulsion in the presence of any one or more of the above-described modifiers. In this process the monomeric materials to be polymerized are emulsified in water with the aid of a suitable emulsifying agent; the modifier of polymerization, together preferably with an initiator of polymerization and, if desired, with catalysts and accelerators of polymerization or other substances necessary or desired for some other purpose, are included in the emulsion and polymerization is then effected at a temperature of about 20 to 100° C. preferably with constant agitation of the emulsion, for a time sufficient to convert a predominant amount, preferably from 70 to 100%, of the monomers into polymers. If the polymerization is conducted only for a time less than is required for substantially complete conversion of monomers into polymers, the polymerization may be terminated at the desired conversion by addition of polymerization inhibitors such as phenyl beta naphthylamine, beta-naphthol and hydroquinone, such substances also serving to stabilize the polymer formed against oxidation. Another alternative in the process consists in adding the modifier of polymerization, or any of the other ingredients, to the emulsion continuously or in stages during the course of the polymerization rather than prior to polymerization. Furthermore, the emulsion polymerization may be carried out in batch operation or it may be effected in a continuous process.

This method of polymerization, employing the modifiers described, is applicable to any polymerizable butadiene-1,3 hydrocarbon such as butadiene-1,3, isoprene, 2,3-dimethyl butadiene-1,3, piperylene, 2-ethyl butadiene-1,3, 2-phenyl butadiene-1,3 and the like either alone or in admixture in any suitable proportion with each other and/or with one or more other unsaturated polymerizable compounds copolymerizable therewith in aqueous emulsion. Compounds copolymerizable with butadiene-1,3 hydrocarbons are generally compounds of the structure >C=C< wherein at least two of the disconnected valences are attached to hydrogen atoms, and are preferably compounds of this >C=C< structure wherein additionally at least one of the disconnected valences is attached to an electronegative group such as chlorine, cyano or organic groups comprising a plural linkage such as aryl groups, groups containing a

structure, a >C=C< structure, a —C≡C— structure or the like. Such compounds include, in addition to other butadiene-1,3 hydrocarbons, other conjugated dienes containing the structure >C=C< wherein at least two of the disconnected valences are attached to hydrogen and at least one is attached to a similar >C=C< group such as chloroprene, 2-cyano butadiene-1,3, cyclopentadiene, myrcene, and the like and monoolefinic copolymerizable compounds (compounds containing a single olefinic double bond present in the structure >C=C< wherein at least two of the disconnected valences are attached to hydrogen, and particularly those containing a single olefinic double bond present in a CH$_2$=C< structure wherein at least one of the disconnected valences is attached to an electronegative group) such as styrene, vinyl naphthalene, para-chloro styrene, para-methoxy styrene, alpha-methyl styrene and other aryl olefins having an aryl group attached to a carbon atom of a >C=C< group; acrylonitrile, methacrylonitrile, alpha-chloro acrylonitrile, methyl acrylate, methyl methacrylate, methallyl methacrylate, methyl alpha-chloro acrylate, acrylic acid, acrylamide, methacrylamide and other polymerizable acrylic compounds possessing a CH$_2$=C< group; vinyl methyl ketone, acrolein, methyl isopropenyl ketone, methyl vinyl ether, methyl vinyl ethynyl carbinol, diethyl fumarate, diallyl maleate, vinyl acetate, vinyl pyridine, vinylidene chloride, isobutylene ethylene and other monoolefinic unsaturated hydrocarbons, ethers, acids, alcohols, aldehydes, ketones, and esters of the character described. When mixtures of butadiene-1,3 hydrocarbons with such copolymerizable compounds are employed, it is preferable but not essential that the butadiene-1,3 hydrocarbon be present in a predominant amount, that is, to the extent of at least 50% by weight of the mixture.

As mentioned hereinabove, in the polymerization of the butadiene-1,3 hydrocarbon in aqueous emulsion in the presence of the modifiers of this invention, it is generally necessary to employ one or more emulsifying agents. The nature of the emulsifying agents so used may be varied widely, any substances capable of maintaining an aqueous emulsion of the butadiene-1,3 hydrocarbons being effective for this purpose. Suitable emulsifying agents include fatty acid soaps, such as sodium oleate, ammonium linoleate, sodium myristate and the like, soaps of hydrogenated or dehydrogenated rosin acids such as sodium dehydroabietate; synthetic saponaceous materials including hymolal sulfates and alkaryl sulfonates such as sodium lauryl sulfate and sodium isopropyl naphthalene sulfonate; salts of organic bases containing long carbon chains such as lauryl amine hydrochloride, trimethylcetylammonium methyl sulfate and C-cetyl betaine; and non-polar emulsifying agents such as the condensation product of lauryl alcohol and ethylene oxide. The choice of the emulsifying agent will depend primarily upon whether it is desired to polymerize in an acid, alkaline or neutral emulson, all such emulsions of varying pH being effective with the modifiers described, although alkaline emulsions using soaps as emulsifying agents are preferred. The amount of the emulsifying agent may also be varied widely and is not critical but in general amounts of from 1 to 5% based on the material polymerized are preferred, this amount corresponding to considerably less than 5% based on the water present in the emulsion since the amount of polymerizable material is generally less than that of the water present.

In addition to the mercapto-ether, the aqueous emulsion of the butadiene-1,3 hydrocarbon will also preferably contain one or more polymerization initiators since the presence of such substances enables the polymerization to be started rapidly. The preferred initiators to be employed are per-oxygen compounds including hydrogen peroxide, benzoyl peroxide, ammonium persulfate, potassium persulfate, sodium perborate and other peroxides and persalts although other types of initiators such as sulfur dioxide, sodium bisulfite, diazoaminobenzene and triphenylmethyl-azobenzene may also be used.

It is also sometimes desirable to employ a polymerization catalyst or accelerator during the polymerization in the presence of the modifiers of this invention. Water-soluble heavy metal compounds including both simple water-soluble heavy metal salts and complex water-soluble heavy metal compounds, particularly the water-soluble compounds of heavy metals occurring in group VIII of the first long period of the periodic table (i. e., iron, cobalt and nickel) such as cobaltous chloride, ferric sulfate, sodium ferri pyrophosphate, sodium cobaltinitrite, potassium ferricyanide and the like, are preferred catalysts for use with the modifiers of this invention, especially when free oxygen is not excluded from the polymerization, since their presence speeds up the polymerization rate and also assists in the production of products of the desired high quality. Another class of substances which may be employed to advantage with the modifiers of this invention are the aliphatic mercaptans containing from 12 to 26 carbon atoms such as lauryl mercaptan, tri-isobutyl mercaptan, cetyl mercaptan, octadecyl mercaptan and the like.

The amounts of the mercapto-ether modifiers, as well as of the polymerization initiators and catalysts, if any, which are employed in the polymerization process may be varied widely depending upon the properties desired in the product as well as upon the particular substances present in the emulsion, and are not strictly critical. In general, however, the amount of the modifier will be between about 0.1 and 5.0% by weight, more preferably from 0.5 to 3% by weight, based on the weight of polymerizable material present. The amount of the initiator need be only quite small, less than 1.0% generally based on the polymerizable material present, while the amount of the catalyst will similarly be less than 1% in most instances, and often less than 0.5%, particularly when the catalyst is a heavy metal compound.

It is to be understood that the above discussion of the various ingredients present in the emulsion during polymerization is given only to show preferred procedures and that the polymerization of the butadiene-1,3 hydrocarbon in aqueous emulsion may be conducted in any desired manner, provided only that a mercapto-ether of the type described is present in the emulsion during the polymerization.

The products obtained from the above-described emulsion polymerization process consist of latex-like dispersions containing butadiene-1,3 polymers or copolymers dispersed in an aqueous medium. Such synthetic latices may be treated in any desired manner and utilized in the same general manner as natural rubber latex. For example they may be subjected to distillation processes to remove the unpolymerized monomers if any; they may be treated to increase the size of the particles of polymer contained therein; they may be utilized as such either compounded or uncompounded in the production of synthetic rubber articles by deposition processes, coating processes and the like and they may be coagulated in any desired manner to produce a synthetic rubber coagulum resembling the unvulcanized natural crude rubber obtained from natural rubber latex in plasticity and processability. Such synthetic rubber may then be utilized in the same general manner as natural rubber to produce a wide variety of vulcanized and unvulcanized products which are often superior to natural rubber products in many properties. When the material polymerized is a mixture containing 1 part of butadiene-1,3 to ¼ to 2 parts of a copolymerizable compound such as styrene, the synthetic rubbers produced are of especial value in the manufacture of tires.

To illustrate the practice of the invention and the desirable results to be obtained thereby, the following examples, in which all parts are by weight, are set forth.

EXAMPLE 17

A mixture of 75 parts of butadiene-1,3 and 25 parts of styrene is emulsified in 180 parts of water containing five parts of fatty acid soap as the emulsifying agent, 0.35 part of potassium persulfate as the polymerization initiator, and 0.614 part of beta(para-tertiaryoctylphenoxy)-beta'-mercapto-diethyl ether (prepared as in Example 5) as the modifier. The emulsion obtained is then agitated at 50° C. for 11.5 hours. A small amount of phenyl beta naphthylamine is then added to the resulting latex-like dispersion; the dispersion is coagulated and the synthetic rubber which is obtained in a yield of 80.8% is washed and dried. The synthetic rubber obtained is strong and coherent yet it is soft and plastic, is 32% soluble in benzene as measured at 40° C. in a standard test, and it is easily milled, forming a smooth band on the back roll of a two-roll mixing mill, both at room temperature and at temperatures as high as 200° F. When compounded in standard tire-tread recipes and vulcanized, excellent vulcanizates possessing tensile strengths of 3,000 to 4,500 lbs. per sq. in., and ultimate elongations of about 600% are obtained. These vulcanizates also possess relatively low hysteresis and are more resistant to flex-cracking than the butadiene-1,3 sytrene copolymers ordinarily obtained, and hence they are of especial utility in the manufacture of synthetic rubber tires. For example, one typical vulcanizate when subjected to the rapid cyclic hysteresis test described by Lessig in Industrial and Engineering Chemistry, Anal. Ed., 9, 582 (1937), exhibits a temperature rise during flexing at 212° F. of only 66° F.

On the other hand when the beta(para-tertiaryoctylphenoxy) - beta' - mercapto - diethyl ether is omitted, the above polymerization requires over 61 hours to produce a 25% yield, and the product obtained is a tough, non-plastic material, which is extremely difficult to mill and which possesses when vulcanized tensile strengths less than 2000 lbs. per sq. in. and elongations less than 400%. Moreover, when the polymerization is carried out in the same manner as in the above example except that an equivalent amount of lauryl mercaptan, one of the most effective modifiers of the prior art, is employed as the polymerization modifier in place of beta(para-tertiaryoctylphenoxy)-beta'-mercapto-diethyl ether, the polymerization requires 14 hours to produce an 80% yield, and the synthetic rubber product obtained, although plastic and soluble in benzene, is more difficult to mill, especially on a hot mill. When vulcanized in the same manner as the synthetic rubber prepared in the above example, the lauryl mercaptan modified rubber yields vulcanizates which possess tensile strengths of only 2000 to 3000 lbs. per sq. in. with elongations of about 600%, and which exhibit a temperature rise during flexing when subjected to the above-identified hysteresis test at 212° F. of 90 to 115° F.

EXAMPLES 13–20

Example 17 is three times repeated using 2 parts, 2½ parts and 3 parts, respectively, of the beta(para - tertiaryoctylphenoxy) - beta' - mercapto-diethyl ether instead of the 0.614 part used in Example 17. In each example yields of 80% of synthetic rubber are obtained in only about 10 hours, and the synthetic rubbers are even more valuable than that described in Example 17. Thus, they are completely soluble in benzene at 40° C.; they can be milled without difficulty at temperatures as high as 300° F., and their vulcanizates, while still possessing tensile strength of 3000 to 4500 lbs. per sq. in., possess elongations as high as 600 to 800%. The resistance to flex-cracking of such vulcanizates, as measured on a De Mattia type flexing machine, is extremely high, the vulcanizates being capable of withstanding from 1,000,000 to 3,000,000 flexures before failure.

On the other hand, when the polymerizations described in these examples are repeated using equivalent amounts of lauryl mercaptan, there is no improvement in polymer properties over the polymer obtained using the amount of mercaptan described in Example 17. Rather, the polymers so obtained possess lower tensile strength, below about 2500 lbs. per sq. in., and low resistance to flex-cracking, being capable of withstanding only about 300,000 flexures when subjected to tests on the De Mattia flexing machine.

The remarkable properties of the synthetic rubbers prepared in these and other examples of this invention, as compared to the properties of synthetic rubbers prepared in the absence of modifiers and using modifiers of the prior art, is probably largely due to a difference in the molecular structure of these synthetic rubbers. Thus, the average intrinsic viscosity, which is a measure of molecular weight, of the synthetic rubber prepared in this example using 2½ parts of modifier, is 2.10, whereas the average intrinsic viscosity of polymers of the prior art is generally less than 2.00. Furthermore, a fractionation of the copolymer obtained in this example using 2½ parts of the modifier, revealed that 46% of the copolymer possesses an intrinsic viscosity over 2.45 and 32% of the copolymer possesses an intrinsic viscosity of less than 0.53, showing a high percentage of relatively low molecular weight material and a high percentage of relatively high molecular weight material in the copolymer. On the other hand, butadiene styrene copolymers of the prior art do not possess such a high percentage of either low molecular weight material or high molecular weight material. Rather, they consist of about 50% of material possessing an intrinsic viscosity in the intermediate range of 0.53 to 2.45 with only about 20% possessing an intrinsic viscosity less than 0.53 and only about 30% possessing an intrinsic viscosity greater than 2.45.

EXAMPLES 21 TO 36

In these examples 75 parts of butadiene-1,3 and 25 parts of styrene are emulsified in 180 parts of water containing 5 parts of fatty acid soap, 0.35 part of potassium persulfate, .5 part of sodium pyrophosphate, 0.035 part of ferric sulfate, and 0.006 part of cobaltous chloride and are subjected to polymerization in the presence of a modifier as described in Example 17. The following table shows the modifiers used, the amount of the modifier, and the polymerization results obtained:

| Example No. | Modifier | Parts of Modifier | Yield, Per Cent | Time, hours |
|---|---|---|---|---|
| 21 | beta-phenoxy ethyl mercaptan (see Example 1) | 0.38 | 78 | 22.8 |
| 22 | beta-phenoxy-beta'-mercapto-diethyl ether (see Example 2) | 0.38 | 76 | 23.2 |
| 23 | beta-thiophenoxy-beta'-mercapto-diethyl ether (see Example 4) | 0.56 | 77 | 17.8 |
| 24 | beta(p-methylphenoxy)-beta'-mercapto-diethyl ether (see Example 6) | 0.55 | 70 | 16.4 |
| 25 | beta(p-isopropylphenoxy)-beta'-mercapto-diethyl ether (see Example 7) | 0.62 | 77 | 14.8 |
| 26 | Same as Example 25 | 2.00 | 80 | 18.7 |
| 27 | beta(p-tertiaryamylphenoxy)-beta'-mercapto-diethyl ether (see Example 8) | 0.74 | 79 | 11.8 |
| 28 | beta(p-cyclohexylphenoxy)-beta'-mercapto-diethyl ether (see Example 10) | 2.00 | 80 | 13.7 |
| 29 | beta(p-isoheptylphenoxy)-beta'-mercapto-diethyl ether (see Example 9) | 2.00 | 81 | 10.6 |
| 30 | beta(p-tertiaryoctylphenoxy)-beta'-mercapto-diethyl ether (see Example 5) | 2.00 | 81 | 10.6 |
| 31 | alpha-alpha'-dimethyl-beta(p-tertiary-octylphenoxy)-beta'-mercapto-diethyl ether (see Example 12). | 2.00 | 79 | 11.8 |
| 32 | beta(2-phenoxyethoxy)-beta'-mercapto-diethyl ether (see Example 14) | 0.60 | 79 | 23.2 |
| 33 | beta(2-p-octylphenoxyethoxy)-beta'-mercapto-diethyl ether (see Example 15) | 2.00 | 82 | 10.6 |
| 34 | beta(2-p-dipentenylphenoxy-ethoxy)-beta'-mercapto-diethyl ether (see Example 16). | 2.00 | 75 | 11.8 |
| 35 | beta-2-naphthoxy-beta'-mercapto-diethyl ether (see Example 3) | 0.61 | 79 | 35.0 |
| 36 | alpha-alpha'-dimethyl-beta-thiophenoxy-beta'-mercapto-diethyl ether (see Example 13). | 0.60 | 79 | 35.0 |
| Control | None | | 80 | >50 |

It may be noted from the data of these examples that the most rapid polymerization rates are secured when aromatic mercapto-aliphatic ethers in which the aromatic group contains a non-aromatic hydrocarbon substituent of more than four carbon atoms (as exemplified by Examples 27-31 and 33-34) are employed as the modifier.

The synthetic rubbers obtained in these examples are similar in properties to those described in Examples 17 and 18-20. Thus, they are all soft and plastic, they may be worked readily on a hot or cold mill and they may be vulcanized to yield strong elastic vulcanizates suitable for use in the manufacture of tires. The synthetic rubber of Example 31, obtained by using an aromatic mercapto-aliphatic ether in which the aliphatic portion of the molecule contains a branched chain, is a particularly soft, plastic and soluble material. The rubber obtained in the control polymerization, wherein no modifier is employed, is hard, non-plastic and incapable of being satisfactorily milled.

EXAMPLES 37-39

In Example 37 a mixture of 75 parts of butadiene-1,3 and 25 parts of styrene is polymerized at 50° C. in an aqueous emulsion also containing 180 parts of water, 5 parts of fatty acid soaps, 0.35 part of potassium persulfate and 0.6 part of beta(p-octylphenoxy)-beta' - mercapto - diethyl ether (prepared from the corresponding commercially available chloride). After 14 hrs. there is obtained in 73% yield a rubbery butadiene-1,3 styrene copolymer which is 20% soluble in benzene without being milled and which when vulcanized possesses a tensile strength of 4000 lbs. sq. in. In the absence of the mercapto-ether modifier a very low yield of polymer which is insoluble in benzene is obtained.

In Example 38, the same polymerization recipe is again employed with the additional presence of 0.5 part of sodium pyrophosphate, 0.035 part of ferric sulfate and 0.012 part of cobaltous chloride, and an 80% yields of a copolymer of substantially the same properties is obtained in 14 hrs. at 50° C. In Example 39, the polymerization of Example 35 is repeated with the additional presence of 0.25 part of cetyl mercaptan, and an 88% yield of copolymer which is 40% soluble in benzene is obtained in 14 hrs. at 50° C. These examples thus illustrate the advantages of employing a polymerization accelerator or catalyst, such as the water soluble heavy metal salts and higher mercaptans, together with the modifiers of this invention.

EXAMPLES 40-43

In Example 40 a monomeric material consisting of 75 parts of butadiene-1,3 and 25 parts of styrene is emulsified in 200 parts of water containing 5 parts of Naccanol N. R. S. F. (the sodium salt of an alkyl benzene sulfonate) as an emulsifying agent, 0.35 part of hydrogen peroxide as a polymerization initator and 0.58 part of a complex iron cobalt pyrophosphate as a polymerization catalyst and polymerized in the presence of 1.0 part of beta(p-octylphenoxy)-beta'-mercapto-diethyl ether as a polymerization modifier. The polymerization requires only about 20 hours to produce a 90% yield of an excellent soft plastic rubbery copolymer yielding strong elastic vulcanizates. In Example 41 a monomeric mixture consisting of 40 parts of butadiene-1,3 and 60 parts of styrene is similarly polymerized and a plastic easily milled benzene soluble rubbery copolymer is again obtained. In Examples 42 and 43 monomeric materials consisting respectively of 100 parts of butadiene-1,3 and of 55 parts of butadiene-1,3, 25 parts of acrylonitrile and 20 parts of methyl acrylate are similarly polymerized and other plastic, soluble, easily-milled polymers are obtained. When all of these monomeric materials are polymerized in the absence of the modifier, however, products which are less plastic and less-readily worked are obtained.

While the foregoing examples have specifically illustrated the method of polymerizing butadiene-1,3 hydrocarbons in aqueous emulsion in the presence of aromatic mercapto-aliphatic ethers as polymerization modifiers and the novel products thereby obtained, and have also partially indicated the extent to which variations and modifications may be made in the nature and proportions of the mercapto-ether employed, in the nature and proportions of the materials polymerized and in the nature and proportions of other substances such as emulsifying agents, polymerization initiators, polymerization catalysts, etc., which are also desirably used in emulsion polymerizations, it is to be understood that the examples do not limit the invention since numerous other modifications and variations in accordance with the foregoing disclosure and the normal skill of the art may be effected without departing from the spirit and scope of the invention as defined in the appended claims.

I claim:

1. The method which comprises polymerizing a butadiene-1,3 hydrocarbon in aqueous emulsion in the presence of a beta-(p-alkyl phenoxy)-beta'-mercapto-diethyl ether in which the alkyl group contains from 4 to 12 carbon atoms.

2. The method which comprises polymerizing a mixture of butadiene-1,3 and styrene in aqueous emulsion in the presence of beta(p-tertiary-octylphenoxy)-beta'-mercapto-diethyl ether.

3. The method which comprises polymerizing a butadiene-1,3 hydrocarbon in aqueous emulsion in the presence of an aromatic mercapto-aliphatic ether wherein an ether linkage is attached on the one hand to a carbon atom occurring in an aliphatic structure comprising a mercapto group and on the other hand to a nuclear carbon atom of an aromatic group containing from 6 to 24 carbon atoms.

4. The method which comprises polymerizing in aqueous emulsion a monomer mixture comprising butadiene-1,3 and a monomer copolymerizable therewith in aqueous emulsion in the presence of a beta-aryloxy beta'-mercapto diethyl ether in which the aryloxy radical contains from 6 to 24 carbon atoms.

5. The method which comprises polymerizing in aqueous emulsion a mixture comprising butadiene-1,3 and a monomer copolymerizable therewith in aqueous emulsion in the presence of an alpha, alpha'-dimethyl beta-aryloxy beta'-mercapto diethyl ether in which the aryloxy radical contains from 6 to 24 carbon atoms.

6. The method which comprises polymerizing a mixture of butadiene-1,3 and styrene in aqueous emulsion in the presence of alpha, alpha'-dimethyl beta-(p-tertiary - octylphenoxy)-beta'-mercapto diethyl ether.

7. The method which comprises polymerizing in aqueous emulsion a mixture comprising butadiene-1,3 and a monomer copolymerizable therewith in aqueous emulsion in the presence of an aryloxy-substituted alkyl mercaptan in which the aryloxy radical contains from 6 to 24 carbon atoms.

8. The method which comprises polymerizing a mixture of butadiene-1,3 and styrene in aqueous emulsion in the presence of beta-phenoxy ethyl mercaptan.

GEORGE L. BROWNING, JR.

REFERENCES CITED

The following references are of record in the file of this patent:

UNITED STATES PATENTS

| Number | Name | Date |
|---|---|---|
| 2,248,107 | Meisenbrug | July 8, 1941 |